United States Patent
Rosenberg et al.

(10) Patent No.: US 11,121,766 B2
(45) Date of Patent: Sep. 14, 2021

(54) WIDEBAND TRANSCEIVER

(71) Applicant: Gilat Satellite Networks Ltd., Petah Tikva (IL)

(72) Inventors: James Jordan Rosenberg, Monrovia, CA (US); Amir Halperin, Givataim (IL); Ely Yehiel Reich, Shoham (IL); Hamutal Slonim, Rishon Lezion (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 50 days.

(21) Appl. No.: 16/751,281

(22) Filed: Jan. 24, 2020

(65) Prior Publication Data

US 2020/0244350 A1 Jul. 30, 2020

Related U.S. Application Data

(60) Provisional application No. 62/797,592, filed on Jan. 28, 2019.

(51) Int. Cl.
*H04B 7/185* (2006.01)
*H04L 1/00* (2006.01)
*H04L 27/26* (2006.01)
*H04L 27/36* (2006.01)

(52) U.S. Cl.
CPC ..... *H04B 7/18543* (2013.01); *H04B 7/18582* (2013.01); *H04L 1/0003* (2013.01); *H04L 27/2649* (2013.01); *H04L 27/364* (2013.01)

(58) Field of Classification Search
CPC ............ H04B 7/18543; H04B 7/18582; H04L 1/0003; H04L 27/2649; H04L 27/364
See application file for complete search history.

(56) References Cited

U.S. PATENT DOCUMENTS

| 2017/0366372 | A1 | 12/2017 | Arnaud et al. |
| 2018/0278324 | A1 | 9/2018 | Qin et al. |
| 2019/0190593 | A1* | 6/2019 | Kay ................... H04B 7/18543 |

OTHER PUBLICATIONS

Jul. 2, 2020—European Search Report—EP 20153096.1.

* cited by examiner

*Primary Examiner* — Ronald B Abelson
(74) *Attorney, Agent, or Firm* — Banner & Witcoff, Ltd.

(57) ABSTRACT

A wideband transceiver for a gateway is presented. The wideband transceiver may interface with the gateway's processors over an interface that carries data encapsulated in baseband frames. The wideband transceiver may comprise a modulator and a high power amplifier and may improve a transmitted signal quality and may utilize a wideband for wireless communications, for example, for a satellite communication system.

20 Claims, 6 Drawing Sheets

WIDEBAND TRANSCEIVER

CROSS-REFERENCE TO RELATED APPLICATIONS

This application claims priority to U.S. Patent Application No. 62/797,592, filed Jan. 28, 2019 and entitled "Wideband Transceiver," which is hereby incorporated by reference herein in its entirety.

FIELD

Aspects of the disclosure pertain to the field of one or more satellite communication systems.

BACKGROUND

A satellite communication system may include a gateway (or hub) and a plurality of terminals communicating with the gateway over a satellite. Satellite communication (e.g., for commercial use) may be performed in C-band or in Ku-band. In both bands, the transmission spectrum usually available for the gateway is 500-750 MHz and the reception spectrum may be similar in width. Thus, the interface between the gateway's baseband equipment (e.g., receivers and transmitters) and its radio frequency transceiver (RFT) may often utilize the L-band frequency range (e.g., 950-1700 MHz). Consequently, the gateway may utilize the entire available spectrum using a single RF chain (per polarization).

Over the past several years, the increasing demand for capacity led to emergence of multi-spot-beam (MSB) satellites (also referred to as high-throughput satellites (HTS) and very-high-throughput satellites (VHTS)) supporting communication between gateways and terminals in Ka-band. By using separate beams for gateways (e.g., feeder beams) and for terminals (e.g., user beams), the available spectrum for each gateway has increased up to approximately 2.5 GHz in each direction (per polarization). However, the RF equipment has not followed up and practically remained with the same capacity as before. For transmission, the high power amplifiers (HPAs) and the block-up-converters (BUCs) have maintained a capacity of about 750 MHz, and their L-band interface frequencies have slightly shifted (e.g., to the 1600-2350 MHz range) to better accommodate the required frequency up-conversion. For reception, low noise amplifiers (LNAs) and low-noise-blocks (LNBs) have supported reception spectrum of about 1.2 GHz, hence their L-band interface frequency range has only mildly been extended (e.g., to the 950-2150 MHz range). Thus, a gateway using the entire Ka-band spectrum (2.5 GHz) would have required about 4 RF chains for transmission and about 2 RF chains for reception (per polarization). Yet, as long as the gateway supported communication over a single satellite, the number of required RF chains remained relatively small and acceptable.

Recently, a new kind of satellite communication systems has been emerging, based on low-earth-orbit (LEO) satellite constellations designed to provide service almost anywhere on Earth. To achieve that goal, these LEO satellite constellations may be designed to comprise hundreds (sometimes even thousands) of satellites. Each of these satellites may support at least one feeder beam (in two polarizations) in the Ka-band, or in a higher band (Q-band or V-band) supporting even more capacity than available in the Ka-band. A gateway for such a communication system may be required to simultaneously support multiple satellites (sometimes tens of satellites). Attempting to build a gateway for such a communication system using the above-mentioned technology may result in a very large number of RF chains. Such a gateway may be expensive to build and to operate.

To reduce the number of RF chains, each RF chain may need to support higher capacity. For example, a single RF chain may need to support an entire feeder beam (one polarization). Transferring 2.5 GHz of spectrum (or more) over an analogue RF interface may require an interface at C-band frequencies (4-8 GHz) or at even higher frequencies. However, attenuation of RF cables at such frequencies is high, hence any such interface will be very limited in distance.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some aspects of the disclosure in a simplified form as a prelude to the description below.

Aspects of the disclosure are directed to a gateway of a satellite communication system. The gateway may comprise an indoor part and an outdoor part that may be at some distance from each other. The indoor part may comprise one or more Internet Protocol encapsulators (IPEs) and one or more frame processors (FPs). The outdoor part may comprise at least one wideband transceiver. The at least one wideband transceiver may be configured to interface with the one or more IPEs using a first digital interface, for example, over an Ethernet based LAN. The at least one wideband transceiver may be configured to interface with the one or more FPs using a second digital interface, for example, over an Ethernet based LAN.

A first protocol associated with the first digital interface may comprise sending, from an IPE of the one or more IPEs and to the at least one wideband transceiver, at least one Ethernet frame comprising at least one adaptive coding and modulation (ACM) tagged frame and a carrier identification field. The at least one ACM tagged frame may comprise at least one baseband frame (e.g., in accordance with the DVB-S2 standard or with the DVB-S2X standard), and an ACM information field. The at least one baseband frame may comprise data to be transmitted (e.g., over a satellite link).

A second protocol associated with the second digital interface may comprise sending, from the at least one wideband transceiver to an FP of the one or more FPs, at least one Ethernet frame comprising at least one baseband frame (e.g., in accordance with the DVB-S2 standard or with the DVB-S2X standard). The at least one baseband frame may be extracted from a modulated carrier (e.g., of one or more modulated carriers) that the wideband transceiver may be configured to receive (e.g., from a satellite). The at least one baseband frame may comprise data to be received.

Aspects of the disclosure are directed to a wideband transceiver, the wideband transceiver may comprise at least one transmission (TX) module and/or at least one reception (RX) module.

The TX module of the wideband transceiver may comprise a digital interface port (e.g., an Ethernet LAN port) and may be configured to receive data to be transmitted (e.g., from one or more IPEs) in accordance with the first digital interface and/or the first protocol. The TX module may comprise at least a digital modulator and a high power amplifier (HPA). The digital modulator may be configured to apply any of an equalization function and/or a pre-distortion function for at least the purpose of improving the transmitted signal quality (e.g., as may be measured through error vector magnitude (EVM)).

The RX module of the wideband transceiver may comprise a digital interface port (e.g., an Ethernet LAN port) and may be configured to send received data (e.g., to one or more FPs) in accordance with the second digital interface and/or the second protocol. The RX module may comprise a plurality of tuner & demodulator elements for at least the purpose of receiving a plurality of carriers.

BRIEF DESCRIPTION OF THE DRAWINGS

Figure 1:
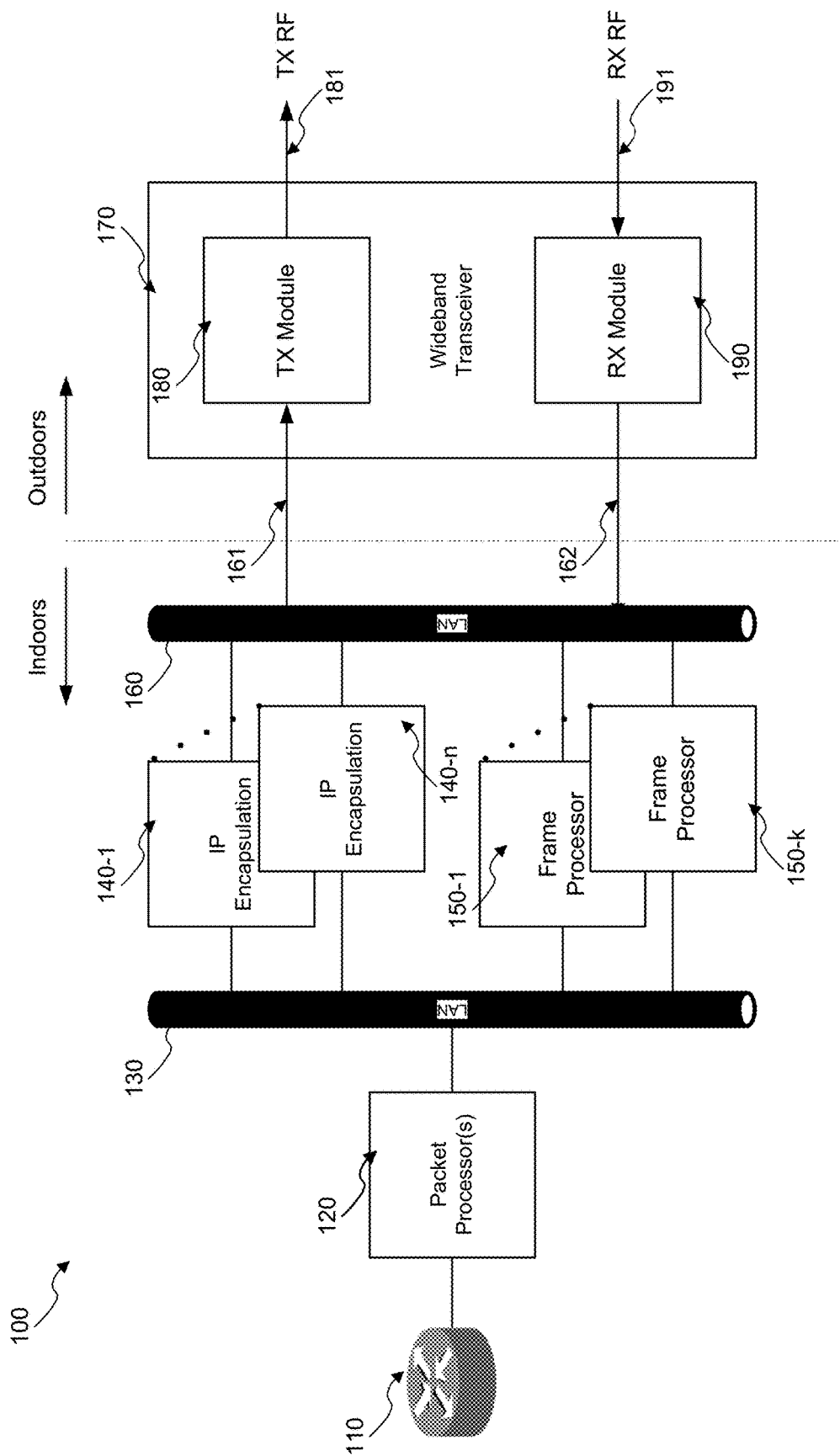

Having thus described the disclosure in general terms, reference will now be made to the accompanying drawings, which are not necessarily drawn to scale, and wherein:

FIG. 1 shows a block diagram of an example gateway in accordance with aspects of the disclosure.

Figure 2:
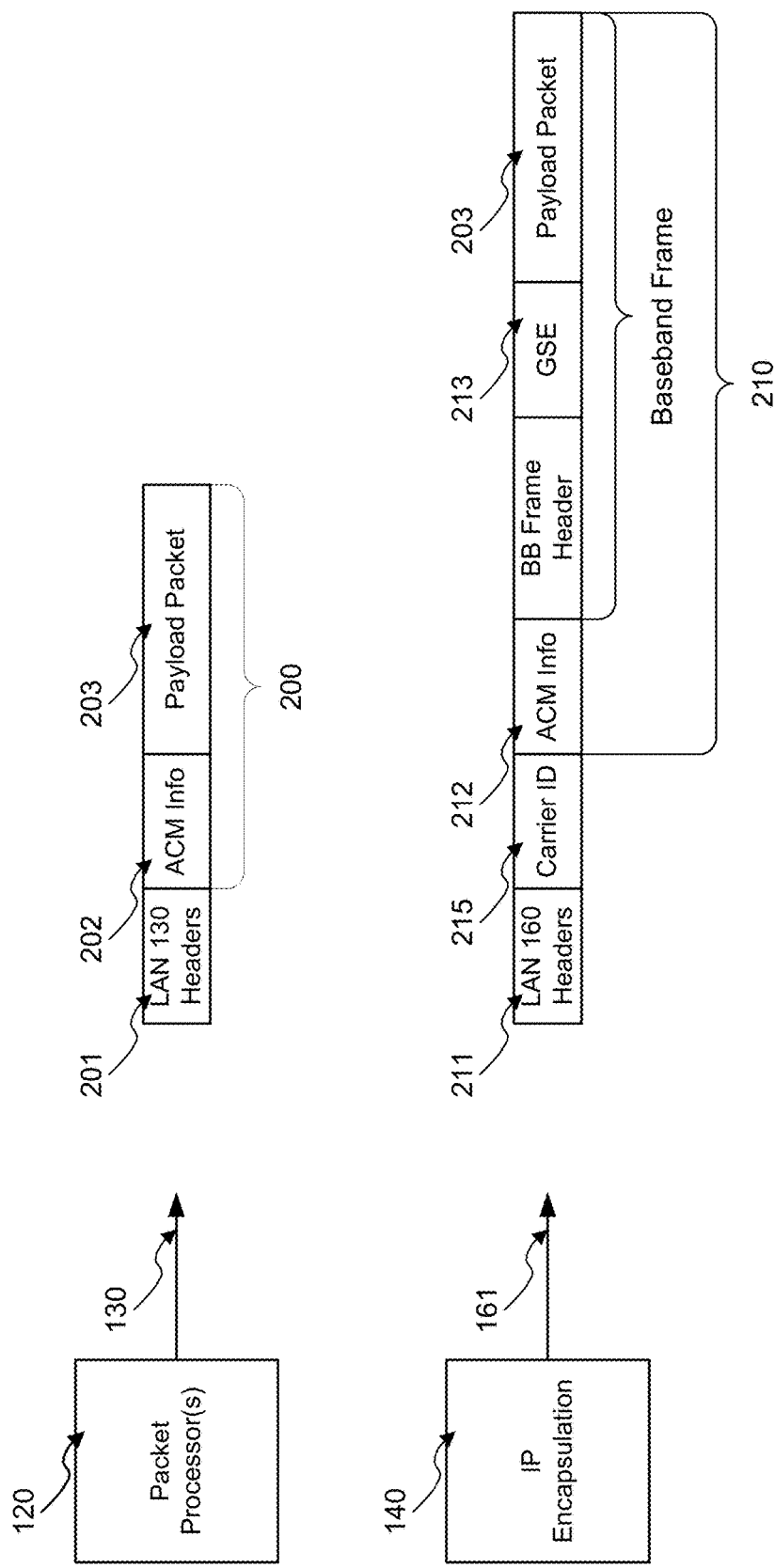

FIG. 2 shows an example protocol for a digital interface in accordance with aspects of the disclosure.

Figure 3:
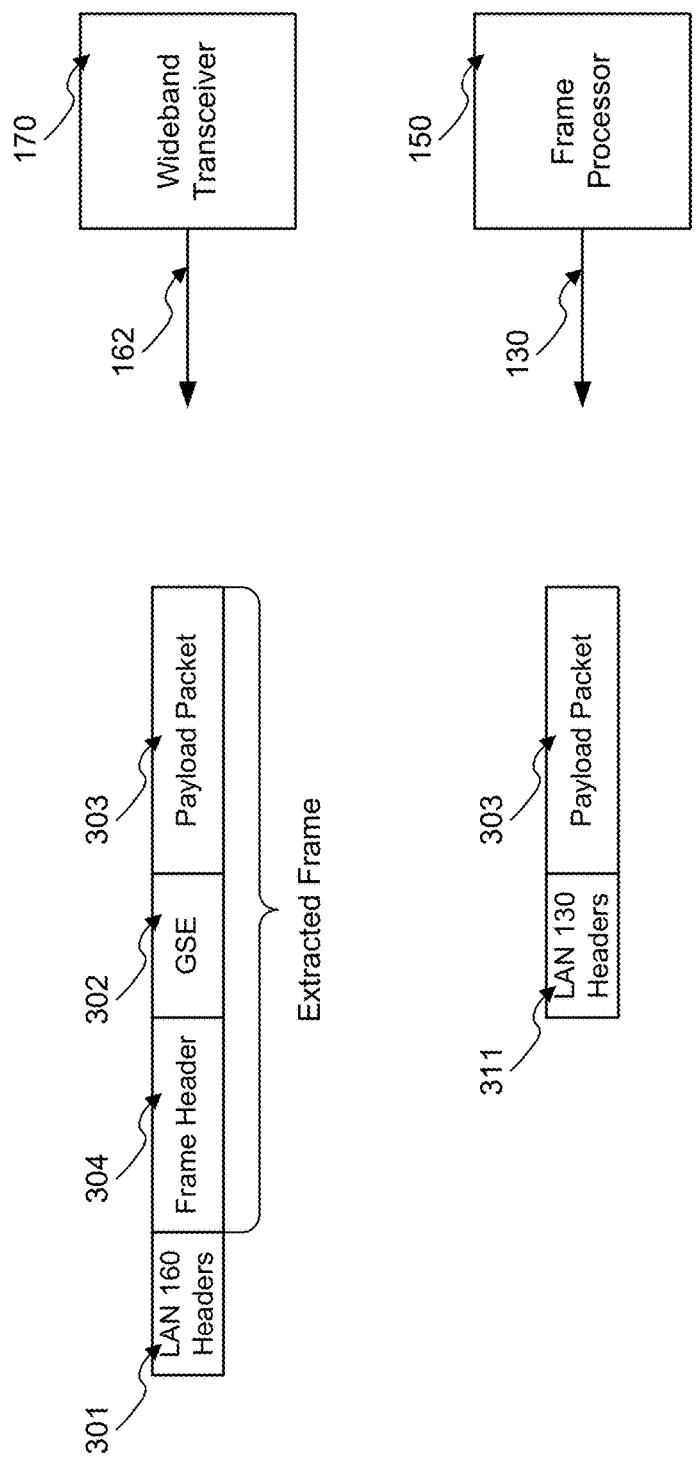

FIG. 3 shows an example protocol for a digital interface in accordance with aspects of the disclosure.

Figure 4:
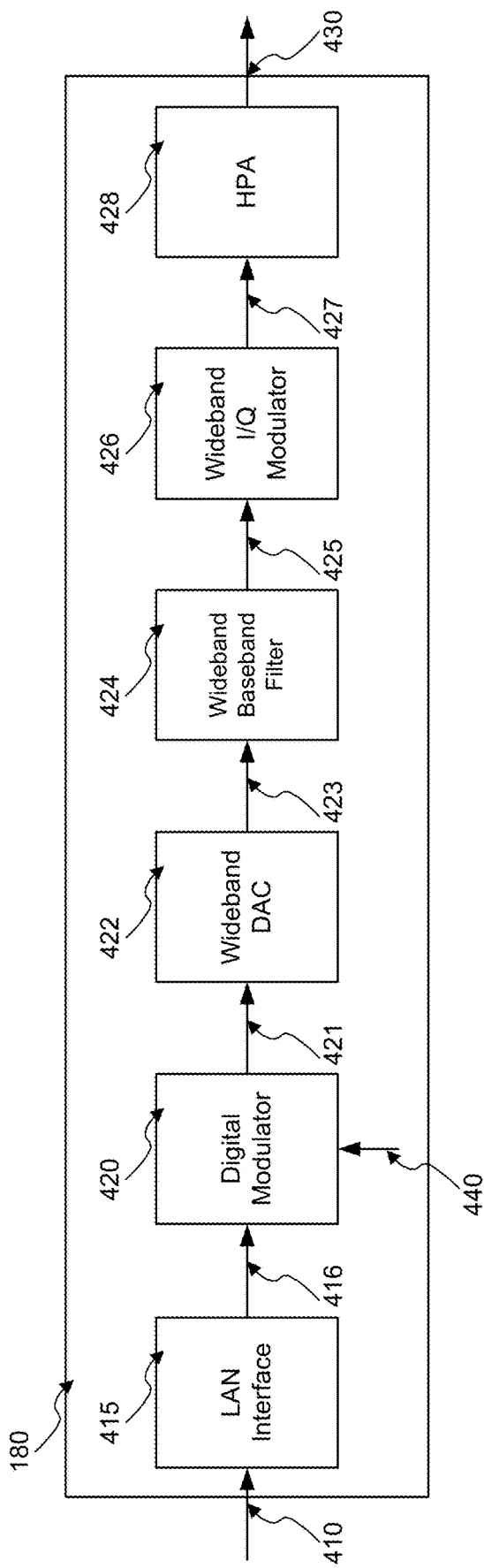

FIG. 4 shows a block diagram of a transmission module in accordance with aspects of the disclosure.

Figure 5:
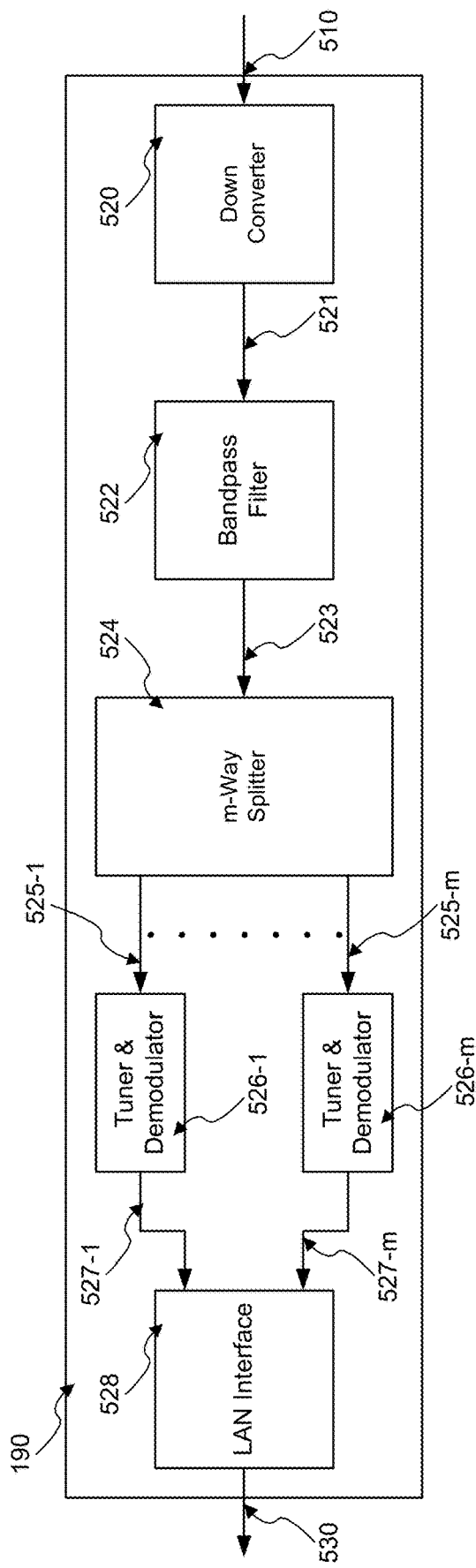

FIG. 5 shows a block diagram of a reception module in accordance with aspects of the disclosure.

Figure 6:
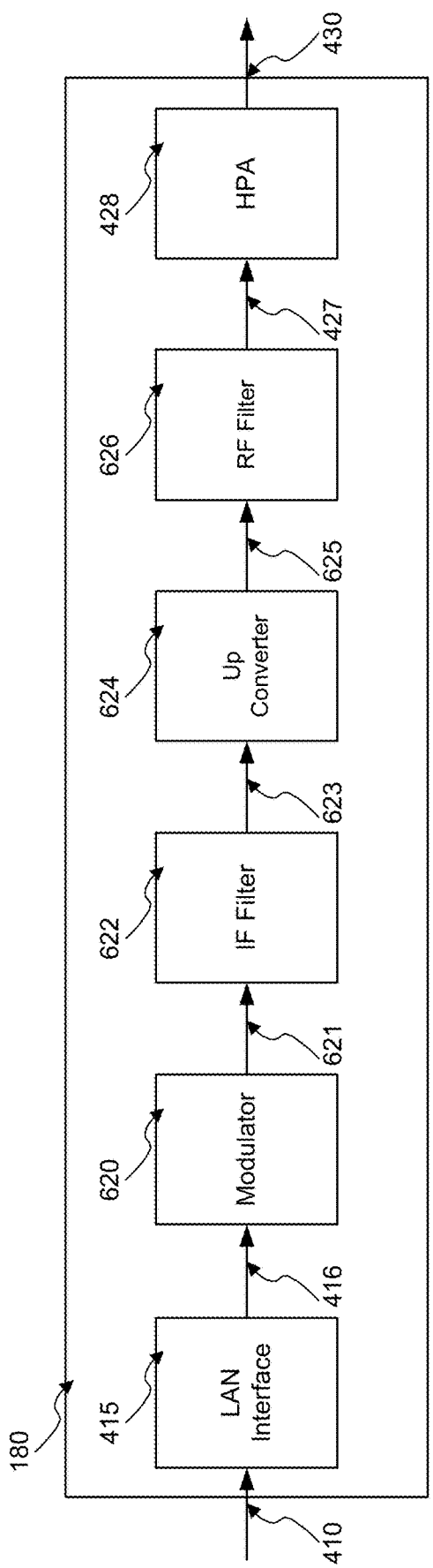

FIG. 6 shows a block diagram of a transmission module in accordance with aspects of the disclosure.

DETAILED DESCRIPTION

FIG. 1 shows a block diagram of an example gateway. A gateway 100 of a satellite communication system may be presented. The gateway 100 may comprise a border router 110, one or more packet processors 120, a first local area network (LAN) 130, one or more Internet Protocol encapsulators (IPEs) 140-1, 140-2, . . . , and 140-n, and one or more frame processors (FPs) 150-1, 150-2, . . . , and 150-k. One or more of the border router 110, the one or more packet processors 120, the first LAN 130, the one or more IPEs 140-1, 140-2, . . . , and 140-n, or the one or more FPs 150-1, 150-2, . . . , and 150-k may be implemented at a first location (e.g., indoors). The gateway 100 may comprise a wideband transceiver 170 that may be implemented at a second location (e.g., outdoors distanced from the indoors facility hosting at least the one or more IPEs 140-1, 140-2, . . . , and 140-n and/or the one or more FPs 150-1, 150-2, . . . , and 150-k). The wideband transceiver 170 may be configured to interface with the one or more IPEs 140-1, 140-2, . . . , and 140-n using a digital interface 161, for example over an Ethernet based LAN. The wideband transceiver 170 may be configured to interface with the one or more FPs 150-1, 150-2, . . . , and 150-k using a digital interface 162, for example over an Ethernet based LAN. The digital interface 161 and the digital interface 162 may utilize a second LAN 160. The digital interface 161 and the digital interface 162 may be associated with separated LANs (not shown in FIG. 1). The wideband transceiver 170 may comprise at least one TX module 180 and at least one RX module 190. The wideband transceiver 170 may be configured to interface an antenna feed using a radio frequency (RF) transmission interface 181 (e.g., coupled to the TX module 180) and an RF reception interface 191 (e.g., coupled to the RX module 190). The RF transmission interface 181 and the RF reception interface 191 may comprise any of waveguide interfaces and/or cable interfaces in accordance with the applicable RF transmission and/or RF reception bands (e.g., Ku-band, Ka-band, Q-band, V-band, etc.).

FIG. 2 shows an example protocol for a digital interface. Referring to FIG. 1 and FIG. 2, a packet may be received at the gateway 100 (e.g., via the border router 110), for example, for transmission toward a terminal that may be configured to receive packets from the gateway 100 over a satellite. The packet may be processed by the packet processor 120 (connected to the border router 110) to produce a corresponding payload packet 203. The packet processor 120 may be configured to at least append an adaptive coding and modulation (ACM) information field 202 to the payload packet 203 to generate an ACM tagged packet 200. The ACM information field 202 may comprise a code corresponding to a maximal (e.g., in terms of required reception signal to noise ratio (SNR)) modulation and coding (MOD-COD) combination for transmitting data towards the terminal. The packet processor 120 may be configured to append to the ACM tagged packet 200 one or more LAN headers 201 (e.g., associated with the LAN 130) to generate an Ethernet frame and to send the Ethernet frame over the LAN 130 to one of the one or more IPEs 140-1, 140-2, . . . , and 140-n (e.g., referred to herein as an IPE 140). Packet processor 120 may be configured to fragment an ACM tagged packet 200 between Ethernet frames and/or send several ACM tagged packets 200 in a single Ethernet frame, as needed and/or applicable.

The IPE 140 may be configured to receive (e.g., over the LAN 130) Ethernet frames containing ACM tagged packets 200 that may be destined to one or more terminals, to encapsulate payload packets 203 included in corresponding ACM tagged packets 200 into a stream of ACM tagged frames 210 in accordance with a protocol associated with digital interface 161 (e.g., as described herein), and to transmit the ACM tagged frames 210 (e.g., within Ethernet frames and over the LAN 160) to the wideband transceiver 170.

The IPE 140 may be configured, upon receiving an Ethernet frame containing an ACM tagged packet 200, to strip the LAN headers 201 from the received Ethernet frame and extract at least one ACM tagged packet 200 from the received Ethernet frame. The IPE 140 may be configured to encapsulate a payload packet 203 included in the at least one ACM tagged packet 200 in accordance with an encapsulation method. The IPE 140 may be configured to encapsulate a payload packet 203 into one or more baseband frames (BBFrames), for example, in accordance with the DVB-S2 standard (e.g., ETSI EN 302 307-1, "Digital Video Broadcasting (DVB); Second generation framing structure, channel coding and modulation systems for Broadcasting, Interactive Services, News Gathering and other broadband satellite applications; Part 1: DVB-S2"). The IPE 140 may be configured to encapsulate a payload packet 203 into one or more baseband frames (BBFrames), for example, in accordance with the DVB-S2X standard (e.g., ETSI EN 302 307-2, "Digital Video Broadcasting (DVB); Second generation framing structure, channel coding and modulation systems for Broadcasting, Interactive Services, News Gathering and other broadband satellite applications; Part 2: DVB-S2 Extensions (DVB-S2X)"). The IPE 140 may be configured to encapsulate a payload packet 203 into one or more baseband frames (BBFrames), for example, in accordance with the GSE standard (e.g., ETSI TS 102 606, "Digital Video Broadcasting (DVB); Generic Stream Encapsulation (GSE)"). For example, the IPE 140 may be configured to encapsulate a payload packet 203 in accordance with GSE by adding a GSE header 213 to the payload packet 203. The IPE 140 may be configured to fragment a payload packet 203 between baseband frames (e.g., encapsulating each fragment in a different baseband frame, for example in accordance with GSE) and/or to encapsulate several payload packets 203 in a single baseband frame (e.g., each payload packet 203 with its corresponding GSE header 213), as necessary and/or applicable. The IPE 140 may be configured to determine which payload packets 203 to encapsulate in a same baseband frame in accordance with the ACM information field 202 associated with each payload packet 203. The IPE 140 may be configured to append an ACM information field 212 to each baseband frame to generate an ACM tagged frame 210. For each ACM tagged frame 210, the ACM information field 212 may comprise a code corresponding to a MODCOD for transmitting the baseband frame included in the ACM tagged frame 210. The IPE 140 may be configured to determine the MODCOD for transmitting a baseband frame in accordance with the MODCODs signaled in ACM information fields 202 associated with the payload packets 203 encapsulated in the baseband frame. For example, the IPE 140 may be configured to determine the MODCOD for transmitting a baseband frame as the minimal MODCOD (e.g., in terms of required reception SNR) associated with any of the payload packets 203 encapsulated in the baseband frame.

The IPE 140 may be configured to append to an ACM tagged frame 210 a carrier identification field 215 and one or more LAN headers 211 (e.g., associated with the LAN 160) to generate an Ethernet frame, and to send the Ethernet frame over the LAN 160 to the wideband transceiver 170. The carrier identification field 215 may be used by the wideband transceiver 170 for determining on which carrier of a plurality of carriers to transmit the baseband frame included in the ACM tagged frame 210. For at least the purpose of simplifying an implementation of the digital interface 161, the IPE 140 may be configured to send a single ACM tagged frame 210 in each Ethernet frame sent to the wideband transceiver 170.

FIG. 3 shows an example protocol for a digital interface. Referring to FIG. 1 and FIG. 3, the wideband transceiver 170 may be configured to receive one or more modulated carriers (e.g., over the RF reception interface 191). The one or more carriers may be modulated and/or formatted, for example, in accordance with the DVB-S2 standard or in accordance with the DVB-S2X standard. The wideband transceiver 170 may be configured to demodulate the one or more modulated carriers, to extract one or more streams of frames from the one or more demodulated carriers, respectively, and to send frames of the one or more streams of frames (e.g., over the LAN 160) to the one or more frame processors (FPs) 150-1, 150-2, . . . , and 150-$k$ in accordance with a protocol associated with the digital interface 162 (e.g., as described herein).

A frame of the one or more stream of frames (e.g., referred to herein as an extracted frame) may comprise a frame header 304 and one or more encapsulated payload packets 303. The frame header 304 may comprise signaling information (e.g., for at least the purpose of extracting at least one payload packet 303 from the extracted frame). The extracted frame may comprise a baseband frame (e.g., in accordance with the DVB-S2 standard or the DVB-S2X standard) and the frame header 304 may comprise a baseband frame header (e.g., in accordance with the DVB-S2 standard or the DVB-S2X standard). The one or more payload packets 303 (and/or a fragment of a payload packet) may be encapsulated in the extracted frame, for example, in accordance with the GSE standard, and the extracted frame may comprise a corresponding GSE header 302 for each of the one or more payload packets 303 (and/or for a fragment of a payload packet).

The wideband transceiver 170 may be configured to send extracted frames to the one or more FPs 150-1, 150-2, . . . , and 150-$k$ (e.g., an FP 150). The wideband transceiver 170 may be configured to send Ethernet frames. Each Ethernet frame may comprise one or more LAN headers 301 (e.g., associated with the LAN 160) and one or more extracted frames. For at least the purpose of simplifying an implementation of the digital interface 162, the wideband transceiver 170 may be configured to send a single extracted frame in each Ethernet frame sent to the FP 150.

The FP 150 may be configured, upon receiving (e.g., over the LAN 160) an Ethernet frame containing one or more extracted frames, to strip the LAN headers 301 from the received Ethernet frame, and to restore the one or more extracted frames. The FP 150 may be configured to extract one or more payload packets 303 from the one or more extracted frames in accordance with encapsulation headers associated with the one or more payload packets 303. Extracting a payload packet 303 may comprise assembling the payload packet 303 from two or more payload packet fragments that may be encapsulated in two or more extracted frames. The one or more payload packets 303 may be encapsulated in the one or more extracted frames, for example, in accordance with the GSE standard, and the FP 150 may be configured to extract the one or more payload packets 303 from the one or more extracted frames, for example, in accordance with GSE headers 302 associated with the one or more payload packets 303.

The FP 150 may be configured to send extracted payload packets 303 to the packet processor 120. The FP 150 may generate Ethernet frames. Each Ethernet frame may comprise one or more LAN headers 311 (e.g., associated with the LAN 130) and one or more payload packets 303. The FP 150 may send the Ethernet frames (e.g., over the LAN 130) to the packet processor 120. The packet processor 120 may be configured to process the payload packets 303 (e.g., in accordance with any relevant protocol), to generate user packets corresponding to the payload packets 303, and to transmit the user packets (e.g., via the boarder router 110) to a user network to which the gateway 100 may be connected.

It may be noted that the digital interfaces 161 and 162 (e.g. as previously described) may present several advantages compared to RF interfaces and/or digitally sampled RF interfaces. In an example, the digital interfaces 161 and 162 may be implemented over optical fibers and support large distances between equipment at the first location (e.g., the IPEs 140-1, 140-2, . . . , and 140-$n$, the FPs 150-1, 150-2, . . . , and 150-$k$, etc.) and equipment at the second location (e.g., the wideband transceiver 170 that may be coupled to an antenna). Such large distances may be supported while avoiding impairments such as attenuation and differences in attenuation at different frequencies (flatness), which are characteristic of RF cables at high frequencies. Such high frequencies may be needed for supporting wideband transmission and/or reception. In an example, the digital interfaces 161 and 162 may require lower speed Ethernet interfaces than digital interfaces based on sampled RF, hence may be less expensive and easier to implement. For digital interfaces 161 and 162, the Ethernet interfaces may need to support speeds similar to the transmitted/ received traffic speeds (e.g., about one bit per second over the Ethernet interface for each bit per second transmitted or received over the satellite link). On the other hand, sampled RF interfaces may require Ethernet interfaces supporting speeds about 10 times the transmitted/received traffic speed. In an example, using Ethernet infrastructure instead of RF infrastructure may enable implementation of redundancy mechanisms based on relatively simple Ethernet switches rather than by using expensive and complicated RF matrixes.

FIG. 4 shows a block diagram of a transmission module. For example, the TX module 180 of a wideband transceiver 170 may be implemented as shown in FIG. 4. The TX module 180 may comprise a LAN interface 415 that may be coupled to an input interface of the TX module 180, a digital modulator 420 that may be coupled to the LAN interface 415, a wideband digital to analog converter (DAC) 422 that may be coupled to the digital modulator 420, a wideband baseband filter 424 that may be coupled to the wideband DAC 422, a wideband I/Q modulator 426 that may be coupled to the wideband baseband filter 424, and a high power amplifier (HPA) 428 that may be coupled to the wideband I/Q modulator 426 and to the output interface of the TX module 180.

The LAN interface 415 may be configured to support reception of Ethernet frames 410 in accordance with the digital interface 161 (e.g., as previously described). The input interface may comprise an optical Ethernet interface and the LAN interface 415 may comprise an optical Ethernet transceiver. The LAN interface 415 may be configured to strip the LAN headers 211 from a received Ethernet frame 410 and send the LAN header-stripped frames 416 to the digital modulator 420.

The digital modulator 420 may be configured to generate an I/Q digital signal (samples) that may correspond to a wideband baseband signal. The wideband baseband signal may comprise one or more modulated carriers. The one or more modulated carriers may be, for example, in accordance with the DVB-S2 standard. The one or more modulated carriers may be, for example, in accordance with the DVB-S2X standard. The wideband baseband signal may be, for example, 2 GHz or more wide (e.g., 2.5 GHz as per the available spectrum in Ka-band). The digital modulator 420 may be configured to receive a LAN header-stripped frame 416 in accordance with the digital interface 161, to extract a carrier identifier field 215 from the frame 416, and to associate the ACM tagged frame 210 included in the frame 416 with a carrier of the one or more modulated carriers in accordance with the carrier identifier 215. The digital modulator 420 may be configured to extract an ACM information field 212 from the ACM tagged frame 210 and to modulate the (information in) the baseband frame included in the ACM tagged frame 210 on to the carrier the ACM tagged frame 210 may be associated with. Modulating the baseband frame on to the carrier may comprise any of scrambling the baseband frame information, appending FEC, bit interleaving, mapping into constellation in accordance with the ACM information field 212, adding pilot symbols, and/or performing baseband shaping. Any of the above operations of modulating the baseband frame may be in accordance with the applicable modulation method (e.g., as previously mentioned). The digital modulator 420 may combine the one or more modulated carriers to a single I/Q digital signal (e.g., two streams of samples, I and Q) to generate the output I/Q digital signal 421.

The wideband DAC 422 may be configured to receive the I/Q digital signal 421 that may correspond to a wideband baseband signal, for example, 2.5 GHz wide. The wideband DAC 422 may be configured to generate an I/Q wideband baseband signal 423 corresponding to the I/Q digital signal 421 by converting each component of the I/Q digital signal 421 to a corresponding analog signal (e.g., an I signal and a Q signal) at a baseband frequency. The wideband baseband filter 424 may be configured to receive the I/Q baseband signal 423, to filter the I/Q baseband signal 423, and to generate a corresponding filtered I/Q baseband signal 425.

The wideband I/Q modulator 426 may be configured to receive the filtered I/Q baseband signal 425 and to generate an RF signal 427 corresponding to the filtered I/Q baseband signal 425. The RF signal 427 may be at a required frequency band, for example, in the Ka-band (e.g., 27.5 GHz to 30 GHz), or in any other applicable band. The RF signal 427 may be transported over a waveguide to the HPA 428. The HPA 428 may be configured to amplify the RF signal 427 and to output the amplified (wideband) RF signal 430 to the output interface of the TX module 180.

A wideband RF signal may be subject to ripple over its bandwidth. Such ripple in the wideband RF signal may result, for example, from ripple introduced by filters, amplifiers, or any other components in the wideband RF signal path that may exhibit different characteristics over the wideband RF signal's bandwidth. Such ripple may degrade the quality of the wideband RF signal, for example, as represented in an error vector magnitude (EVM) measurement. The higher the ripple, the higher the EVM and consequently the lower the effective reception SNR. Yet, as the TX module 180 may include the entire transmission chain (e.g., from the digital modulator 420 to the HPA 428), the ripple in the amplified wideband RF signal 430 may be significantly reduced (and consequently the effective reception SNR may be improved). The amplitude v. frequency characteristics of the amplified wideband RF signal 430 (e.g., without equalization) may be measured, for example during production of the TX module 180, and an equalization vector 440 corresponding to the measurement may be provided to the digital modulator 420 and may be preserved in a non-volatile memory associated with the digital modulator 420. The digital modulator 420 may be configured to use the equalization vector 440 for applying equalization as part of generating the I/Q digital signal 421 (that may correspond to the wideband baseband signal), for example, to mitigate the previously measured amplitude v. frequency characteristics. The ripple (the amplitude v. frequency characteristics) in the equalized amplified wideband RF signal 430 may be measured again and, if necessary, a different equalization vector 440 may be provided to the digital modulator 420 (e.g., for at least the purpose of further reducing the ripple in the amplified wideband RF signal 430). The above described process may be repeated as it may be necessary. For example, the above described process may be repeated until the ripple in the amplified wideband RF signal 430 is reduced to a sufficiently low value.

As the TX module 180 may include the entire transmission chain (e.g., from the digital modulator 420 to the HPA 428), and since the entire output spectrum may be generated as a single signal, applying digital pre-distortion may become more practical. The digital modulator 420 may be configured to apply pre-distortion as part of generating the I/Q digital signal 421 (e.g. for at least the purpose of at least reducing a level of distortion that may be associated with the amplified wideband RF signal 430).

The output signal 427 of the wideband I/Q modulator 426 may be coupled to the output interface of TX module 180, and an external HPA may be connected to the output interface of TX module 180, for example, if the TX module 180 does not comprise the HPA 428. Any equalization and/or pre-distortion applied by digital modulator 420 may still be provided but without accounting for ripple and/or distortion applied by an external HPA.

The TX module 180 may comprise management, monitoring and control elements, such as but not limited to any of power detectors, temperature sensors, a test signal input port (e.g., for transmitting a test carrier towards a satellite), a controller (e.g., for collecting telemetry and interacting with an external management system), an Ethernet interface dedicated for management, etc.

FIG. 5 shows a block diagram of a reception module. For example, the RX module 190 of the wideband transceiver 170 may be implemented as shown in FIG. 5. The RX module 190 may comprise a frequency down converter 520 that may be coupled to an input interface of the RX module 190, a bandpass filter 522 that may be coupled to the frequency down converter 520, a splitter 524 that may be coupled to the bandpass filter 522, a plurality of tuner & demodulator elements 526-1, 526-2, . . . , and 526-m (e.g., each tuner & demodulator element may be coupled to a different output of the splitter 524), and a LAN interface 528 that may be coupled to the plurality of tuner & demodulator elements 526-1, 526-2, . . . , and 526-m and to an output interface of the RX module 190. The RX module 190 may not comprise a low-noise amplifier (LNA) and the input interface of the RX module 190 may be connected (e.g., by cable or by waveguide) to an external LNA that may be mounted as closely as possible to an antenna feed.

One or more of the tuner & demodulator elements 526-1, 526-2, . . . , and 526-m (e.g., a tuner & demodulator element 526-i, where $1 \leq i \leq m$) may be configured to tune on and demodulate one or more carriers, and to extract one or more streams of frames (e.g., extracted frames) corresponding to the one or more carriers. An extracted frame may be formatted, for example, as previously described in reference to FIG. 3. An extracted frame may comprise a frame header 304 and one or more encapsulated payload packets 303 with their associated encapsulation headers (e.g., GSE header 302). In some embodiments, a carrier may be formatted using time-slicing (e.g., in accordance with DVB-S2 annex M), and two or more tuner & demodulator elements 526-1, 526-2, . . . , and 526-m may be configured to tune to a same carrier at least for the purpose of extracting two or more streams of frames corresponding to the time-sliced carrier. The one or more tuner & demodulator elements 526-1, 526-2, . . . , and 526-m may be configured to tune on one or more carriers at an intermediate frequency band (e.g., in L-band, for example, between 950 MHz and 2150 MHz) and over a bandwidth that may be smaller than the bandwidth of the input interface of the RX module 190 (e.g., 1.2 GHz v. 2.5 GHz, respectively).

The frequency down converter 520 may comprise an input filter corresponding to the reception frequency band (e.g., 17.7 GHz to 20.2 GHz in Ka-band), and a down converter coupled to the input filter. The down converter may be configured to output, at the intermediate frequency band that may be supported by the tuner & demodulator elements 526-1, 526-2, . . . , and 526-m, a portion 521 of the input signal 510 corresponding to a portion of the input frequency band. The bandpass filter 522 may be configured to filter the output signal 521 of the frequency down converter, for example, to reject undesired byproducts of the down conversion, and to output a filtered signal 523. The splitter 524 may be configured to split the filtered signal 523 into a plurality of signals 525-1, 525-2, . . . , and 525-m. Each signal of the plurality of signals 525-1, 525-2 . . . , and 525-m may correspond to the filtered signal 523, and the plurality of signals 525-1, 525-2, . . . , and 525-m may be respectively provided to the plurality of tuner & demodulator elements 526-1, 526-2, . . . , and 526-m (e.g., a signal 525-i for tuner & demodulator 526-i, where $1 \leq i \leq m$). The tuner & demodulator element 526-i may be configured to tune on and demodulate one or more carriers that may be included in the signal 525-i, to extract one or more streams of frames (e.g., as previously described), and to send extracted frame 527-i included in the one or more streams of frames to the LAN interface 528. The LAN interface 528 may be configured to support transmission of extracted frames in accordance with the digital interface 162 (e.g., as previously described). The output interface of the RX module 190 may comprise an optical Ethernet interface, and the LAN interface 528 may comprise an optical Ethernet transceiver. The LAN interface 528 may be configured to append LAN headers 301 to extracted frames to generate Ethernet frames and send the generated Ethernet frames over the output interface 530.

At least for the purpose of supporting reception over the entire input frequency band, the down converter 520 may comprise a splitter coupled to the input filter and a plurality of down converters coupled to the splitter. Each down converter of the plurality of down converters may be provided with a local oscillator at a different frequency. Consequently, each down converter may output a signal corresponding to a different portion of the input frequency band and the plurality of output signals (e.g., the plurality of output signals in their entirety) may correspond to the entire input frequency band. The down converter 520 may output a plurality of output signals 521 corresponding to the plurality of down converters, and the rest of the chain (e.g., the chain comprising the bandpass filter 522, the splitter 524, and the tuner & demodulator elements 526-1, 526-2, . . . , and 526-m) may be duplicated in accordance with the plurality of output signals 521. For example, a plurality of modules each comprising the bandpass filter 522, the splitter 524, and the tuner & demodulator elements 526-1, 526-2, . . . , and 526-m may be implemented in the RX module 190 to receive the plurality of output signals 521.

The RX module 190 may comprise management and control elements, such as but not limited to any of monitoring ports, temperature sensors, a controller (e.g., for collecting telemetry and interacting with an external management system), an Ethernet interface dedicated for management, etc.

The wideband transceiver 170 may be configured to transmit in a single polarization and receive in a single polarization and may comprise one or more TX modules 180 and one or more RX modules 190. The one or more TX modules 180 may be configured to transmit a signal occupying any portion of the output frequency band, including over the entire output frequency band, and in the transmission polarization. The one or more RX modules 190 may be configured to receive a signal occupying any portion of the input frequency band, including the entire input frequency band, and in the reception polarization.

A wideband transceiver may be configured to transmit in both polarization and receive in both polarization. The wideband transceiver may comprise two wideband transceivers 170, each of the two wideband transceivers 170 may be configured, for example, as previously described. Each wideband transceiver 170 may be configured to transmit/receive on the opposite polarization as the other wideband transceiver 170 and have dedicated output and input interfaces (181 and 191, respectively).

FIG. 6 shows a block diagram of a transmission module. For example, the TX module 180 of the wideband transceiver 170 may be implemented as shown in FIG. 6. The TX module 180 may comprise a LAN interface 415 that may be coupled to the an input interface of the TX module 180, a modulator 620 that may be coupled to the LAN interface 415, an intermediate frequency (IF) filter 622 that may be coupled to the modulator 620, a frequency up converter (UC) 624 that may be coupled to the IF filter 622, an RF filter 626 that may be coupled to the UC 624, and an HPA 428 that may be coupled to the RF filter 626 and to the output interface of the TX module 180.

The LAN interface 415 may be configured to support reception of Ethernet frames 410 in accordance with the digital interface 161, and to send received frames 416 included in the Ethernet frames to the modulator 620 (e.g., as previously described in reference to FIG. 4). The modulator 620 may be configured to generate (e.g., an analog) wideband baseband signal 621. The wideband baseband signal 621 may comprise one or more modulated carriers. The one or more modulated carriers may be, for example, in accordance with the DVB-S2 standard. The one or more modulated carriers may be, for example, in accordance with the DVB-S2X standard. The wideband baseband signal may be up to 2.5 GHz wide (e.g., occupying a portion of a frequency range of 0.8 GHz to 3.3 GHz). The modulator 620 may be configured to receive a frame 416 in accordance with the digital interface 161 and to modulate information included in the frame 416 on to a carrier of the one or more modulated carriers (e.g., as previously described in reference to the digital modulator 420).

The IF filter 622 may be configured to filter the wideband baseband signal 621 to produce a filtered baseband signal 623. The frequency UC 624 may be configured to generate an RF signal 625 corresponding to the filtered baseband signal 623. The RF signal 625 may be at a required frequency band, for example, in the Ka-band (e.g., 27.5 GHz to 30 GHz), or in any other applicable band. The RF filter 626 may be configured to produce a filtered RF signal 427 that may be transported over a waveguide to the HPA 428. The HPA 428 may be configured to amplify the filtered RF signal 427 and to output the amplified (wideband) RF signal 430 to the output interface of the TX module 180.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. An apparatus comprising:
an interface configured to receive at least one frame and to remove a first header from the at least one frame to produce at least one stripped frame;
a modulator configured to:
associate, based on a carrier identifier included in the at least one stripped frame, an adaptive coding and modulation (ACM) tagged frame included in the at least one stripped frame with a carrier corresponding to the carrier identifier;
extract a baseband frame included in the ACM tagged frame; and
modulate the baseband frame on to the carrier to generate a modulated signal;
a filter configured to generate, based on the modulated signal, a filtered baseband signal; and
a transmitter configured to transmit a radio frequency (RF) signal corresponding to the filtered baseband signal.

2. The apparatus of claim 1, wherein the modulator is configured to extract an ACM information field from the ACM tagged frame, and to generate, based on the ACM information field, the modulated signal.

3. The apparatus of claim 1, further comprising a digital-to-analog converter (DAC) configured to generate, based on the modulated signal, an I/Q baseband signal, wherein the modulated signal comprises an I/Q digital signal,
wherein the filter is configured to generate, based on the I/Q baseband signal, the filtered baseband signal.

4. The apparatus of claim 1, wherein the modulator is further configured to:
receive an equalization vector; and
apply, based on the equalization vector, equalization to the modulated signal, wherein the modulated signal comprises an I/Q digital signal.

5. The apparatus of claim 1, wherein the modulator is further configured to apply digital pre-distortion to the modulated signal, wherein the modulated signal comprises an I/Q digital signal.

6. The apparatus of claim 1, wherein the modulator is further configured to:
associate, based on a second carrier identifier included in at least one second stripped frame, a second ACM tagged frame included in the at least one second stripped frame with a second carrier corresponding to the second carrier identifier; and
extract a second baseband frame included in the second ACM tagged frame.

7. The apparatus of claim 1, further comprising:
a frequency down converter;
a bandpass filter coupled to the frequency down converter, the bandpass filter being associated with an intermediate frequency (IF) band;
a splitter coupled to the bandpass filter, wherein the splitter comprises a plurality of output ports;

a plurality of demodulators respectively coupled to the plurality of output ports of the splitter, wherein at least one demodulator of the plurality of demodulators is configured to:
  demodulate one or more carriers in the IF band; and
  extract one or more streams of frames corresponding to the one or more carriers; and
a second interface coupled to the plurality of demodulators.

8. The apparatus of claim 7, wherein the frequency down converter further comprises:
  an input filter corresponding to a reception frequency band and configured to filter an input signal to output a filtered input signal; and
  a down converter coupled to the input filter and configured to output, at the IF band, a portion of the filtered input signal corresponding to a portion of the reception frequency band.

9. The apparatus of claim 7, wherein the frequency down converter comprises:
  an input filter corresponding to a reception frequency band;
  a second splitter coupled to the input filter, the second splitter comprising a second plurality of output ports; and
  a second plurality of down converters coupled to the second plurality of the output ports of the second splitter,
  wherein the second plurality of down converters each comprises a local oscillator associated with a different frequency in the reception frequency band,
  wherein the second plurality of down converters each generates a different output signal associated with the IF band, each of the different output signals corresponding to a portion of an input signal associated with a different portion of the reception frequency band, and
  wherein the different output signals correspond to the reception frequency band.

10. A gateway comprising:
  one or more Internet Protocol encapsulators (IPEs); and
  at least one transceiver configured to interface, via a first interface, with the one or more IPEs, wherein:
    the at least one transceiver receives, from at least one IPE of the one or more IPEs, at least one frame comprising at least one adaptive coding and modulation (ACM) tagged frame and a carrier identifier,
    the at least one ACM tagged frame comprises at least one baseband frame and an ACM information field, and
    the at least one baseband frame comprises data to be transmitted over a satellite link.

11. The gateway of claim 10, wherein the at least one transceiver comprises:
  the first interface configured to receive the at least one frame and to remove a first header from the at least one frame to produce at least one stripped frame;
  a modulator configured to:
    associate, based on the carrier identifier included in the at least one stripped frame, the at least one ACM tagged frame included in the at least one stripped frame with a carrier corresponding to the carrier identifier;
    extract at least one baseband frame included in the at least one ACM tagged frame; and
    modulate the at least one baseband frame on to the carrier to generate a modulated signal;
  a filter configured to generate, based on the modulated signal, a filtered baseband signal; and
  a transmitter configured to transmit a radio frequency (RF) signal corresponding to the filtered baseband signal.

12. The gateway of claim 10, further comprising one or more frame processors (FPs), wherein the at least one transceiver is configured to:
  receive a plurality of modulated carriers; and
  interface with the one or more FPs using a second interface.

13. The gateway of claim 12, wherein:
  the at least one transceiver is configured to transmit, to at least one FP of the one or more FPs, at least one second frame comprising at least one second baseband frame;
  the at least one second baseband frame is extracted from a modulated carrier of the plurality of modulated carriers; and
  the at least one second baseband frame comprises data to be received by the gateway.

14. The gateway of claim 13, wherein the second interface comprises an Ethernet-based local-area network (LAN) interface, and wherein the at least one second frame comprises an Ethernet frame.

15. A method comprising:
  receiving, by a wireless transceiver and via a first interface, at least one frame;
  determining, based on removing a first header from the at least one frame, at least one stripped frame;
  associating, based on a carrier identifier included in the at least one stripped frame, an adaptive coding and modulation (ACM) tagged frame included in the at least one stripped frame with a carrier corresponding to the carrier identifier;
  extracting a baseband frame included in the ACM tagged frame; and
  modulating the baseband frame on to the carrier to generate a modulated signal;
  generating, based on the modulated signal, a filtered baseband signal; and
  transmitting a radio frequency (RF) signal corresponding to the filtered baseband signal.

16. The method of claim 15, wherein the first interface comprises a local-area network (LAN) interface that comprises an optical Ethernet transceiver.

17. The method of claim 15, further comprising:
  extracting an ACM information field from the ACM tagged frame; and
  generating, based on the ACM information field, the modulated signal.

18. The method of claim 15, further comprising:
  receiving an equalization vector; and
  applying, based on the equalization vector, equalization to the modulated signal, wherein the modulated signal comprises an I/Q digital signal.

19. The method of claim 15, further comprising applying digital pre-distortion to the modulated signal, wherein the modulated signal comprises an I/Q digital signal.

20. The method of claim 15, further comprising:
  associating, based on a second carrier identifier included in at least one second stripped frame, a second ACM tagged frame included in the at least one second stripped frame with a second carrier corresponding to the second carrier identifier; and extracting a second baseband frame included in the second ACM tagged frame.

\* \* \* \* \*